(12) United States Patent
Yokoyama et al.

(10) Patent No.: US 9,152,000 B2
(45) Date of Patent: Oct. 6, 2015

(54) LIQUID CRYSTAL DISPLAY

(71) Applicant: Samsung Display Co., Ltd., Yongin, Gyeonggi-do (KR)

(72) Inventors: Ryoichi Yokoyama, Tokyo (JP); Michiru Senda, Tokyo (JP)

(73) Assignee: SAMSUNG DISPLAY CO., LTD., Yongin, Gyeonggi-Go (KR)

( * ) Notice: Subject to any disclaimer, the term of this patent is extended or adjusted under 35 U.S.C. 154(b) by 126 days.

(21) Appl. No.: 13/945,258

(22) Filed: Jul. 18, 2013

(65) Prior Publication Data

US 2013/0300963 A1 Nov. 14, 2013

Related U.S. Application Data

(63) Continuation of application No. 11/929,260, filed on Oct. 30, 2007, now Pat. No. 8,502,765.

(30) Foreign Application Priority Data

Dec. 11, 2006 (KR) .......................... 10-2006-125722

(51) Int. Cl.
*G02F 1/1343* (2006.01)
*G02F 1/1362* (2006.01)
*G09G 3/36* (2006.01)

(52) U.S. Cl.
CPC ........ *G02F 1/136213* (2013.01); *G09G 3/3655* (2013.01); *G09G 2300/0876* (2013.01); *G09G 2320/0252* (2013.01); *G09G 2320/0261* (2013.01)

(58) Field of Classification Search
CPC .................................................. G02F 1/136213
USPC ....................................................... 349/38–39
See application file for complete search history.

(56) References Cited

U.S. PATENT DOCUMENTS

| | | | |
|---|---|---|---|
| 5,151,805 A | 9/1992 | Takeda et al. | |
| 7,068,330 B2 * | 6/2006 | Song et al. | 349/39 |
| 2002/0018035 A1 * | 2/2002 | Song et al. | 345/87 |
| 2004/0001167 A1 * | 1/2004 | Takeuchi et al. | 349/38 |
| 2006/0284811 A1 | 12/2006 | Huang | |

FOREIGN PATENT DOCUMENTS

| | | |
|---|---|---|
| KR | 1020010092374 | 10/2001 |
| WO | 2006049245 | 5/2006 |

* cited by examiner

*Primary Examiner* — Nathanael R Briggs
(74) *Attorney, Agent, or Firm* — F. Chau & Associates, LLC (57) ABSTRACT

A liquid crystal display includes a plurality of pixels, each of which includes a thin film transistor (TFT), a gate line supplying a driving signal to a gate of the TFT of each pixel, a liquid crystal capacitor included in each pixel and connected to one terminal of the TFT in a corresponding pixel, a sub-capacitor line aligned in parallel to the gate line, a sub-capacitor included in each pixel and connected between one terminal of the TFT in a corresponding pixel and the sub-capacitor line, and a driving circuit having at least four voltages, selecting one of the voltages and supplying the selected voltage to the sub-capacitor line to drive the liquid crystal display in a state in which the liquid crystal capacitor is capacitively coupled to the sub-capacitor.

7 Claims, 8 Drawing Sheets

Fig. 7

LIQUID CRYSTAL DISPLAY

CROSS-REFERENCE TO RELATED APPLICATION

This application is a continuation application of U.S. application Ser. No. 11/929,260 filed Oct. 30, 2007, which claims priority to Korean Patent Application No. 10-2006-125722, filed on Dec. 11, 2006, the disclosure of which is herein incorporated by reference in its entirety.

BACKGROUND OF THE INVENTION

1. Technical Field

The present invention relates to a liquid crystal display (LCD), and more particularly to an active matrix liquid crystal display (AMLCD).

2. Discussion of Related Art

An LCD controls the erect or alignment state of the liquid crystal molecules of each pixel by driving corresponding thin film transistors (TFTs). The LCD has a plurality of pixels aligned in a predetermined direction. The TFTs operate by driving signals supplied to gate electrodes through gate lines. The gate lines pass through the pixels aligned in the predetermined direction. Each pixel has a liquid crystal capacitor and one terminal of the liquid crystal capacitor is connected to one terminal of the TFT. Sub-capacitor lines extend in parallel to the gate lines over a plurality of pixels. The sub-capacitor lines transmit signals to sub-capacitor devices. A sub-capacitor device is connected between the sub-capacitor line and one terminal of each TFT. A driving circuit is connected to the sub-capacitor lines and applies a voltage to the sub-capacitor lines. As the voltage is applied to the sub-capacitor lines through the driving circuit, the sub-capacitor devices are charged and the sub-capacitor devices are capacitively coupled to the liquid crystal capacitors. As a result, the erect state or alignment state of the liquid crystal molecules in each pixel is maintained.

The liquid crystal molecules may be fixed at a desired erect or alignment state by applying voltages having two different values to the sub-capacitor lines. However, adjusting the erect or alignment state of the liquid crystal molecules to a desired state by using the two different voltage values can be difficult. Further, the liquid crystal molecules may take a relatively long time in transitioning to the erect or alignment state and it can be difficult to improve the response speed of the liquid crystal molecules.

Thus, there is a need for an LCD that can rapidly adjust the alignment of liquid crystal molecules into a desired erect state.

SUMMARY OF THE INVENTION

In an exemplary embodiment of the present invention, a liquid crystal display comprises a plurality of pixels, a gate line, a liquid crystal capacitor, a sub-capacitor line, a sub-capacitor and a driving circuit. The pixels may be aligned in a predetermined direction. Each pixel has a thin film transistor (TFT). The gate line supplies a driving signal to a gate of the TFT in each pixel. The liquid crystal capacitor is included in each pixel and connected to an output terminal of the TFT in a corresponding pixel. The sub-capacitor line is aligned in parallel to the gate line. The sub-capacitor is included in each pixel and connected between the output terminal of the TFT in a corresponding pixel and the sub-capacitor line. The driving circuit provides at least four voltages, selects one of the voltages and supplies the selected voltage to the sub-capacitor line, to drive the liquid crystal display in a state in which the liquid crystal capacitor is capacitively coupled to the sub-capacitor.

The driving circuit may repeatedly supply the four voltages to the sub-capacitor line in a sequence of the third voltage, the fourth voltage, the second voltage and the first voltage, in which the first voltage>the second voltage>the third voltage>the fourth voltage.

In exemplary embodiment of the present invention, a liquid crystal display comprises a plurality of pixels, a gate line, a liquid crystal capacitor, a sub-capacitor line, a first sub-capacitor, a second sub-capacitor and a driving circuit. The pixels may be aligned in a predetermined direction. Each pixel includes a TFT and is classified as a first group pixel and a second group pixel. The gate line supplies a driving signal to a gate of the TFT in each pixel. The liquid crystal capacitor is included in each pixel and connected to one terminal of the TFT in a corresponding pixel. The sub-capacitor line comprises a first sub-capacitor line and a second sub-capacitor line aligned such that the gate line is interposed between the first and second sub-capacitor lines. The first sub-capacitor is included in the first group pixel and connected between one terminal of the TFT in a corresponding pixel and the first sub-capacitor line. The second sub-capacitor is included in the second group pixel and connected between one terminal of the TFT in a corresponding pixel and the second sub-capacitor line. The driving circuit has at least four voltages, selects one of the voltages, and supplies the selected voltage to the first sub-capacitor line and the second sub-capacitor line to operate the liquid crystal display in a state in which the liquid crystal capacitor is capacitively coupled to the first sub-capacitors in the first group pixel, and the liquid crystal capacitor is capacitively coupled to the second sub-capacitor in the second group pixel.

BRIEF DESCRIPTION OF THE DRAWINGS

The present invention will become readily apparent by reference to the following detailed description when considered in conjunction with the accompanying drawings wherein.

DETAILED DESCRIPTION OF EXEMPLARY EMBODIMENTS

Hereinafter, exemplary embodiments of the present invention will be explained in detail with reference to the accompanying drawings.

Figure 1:
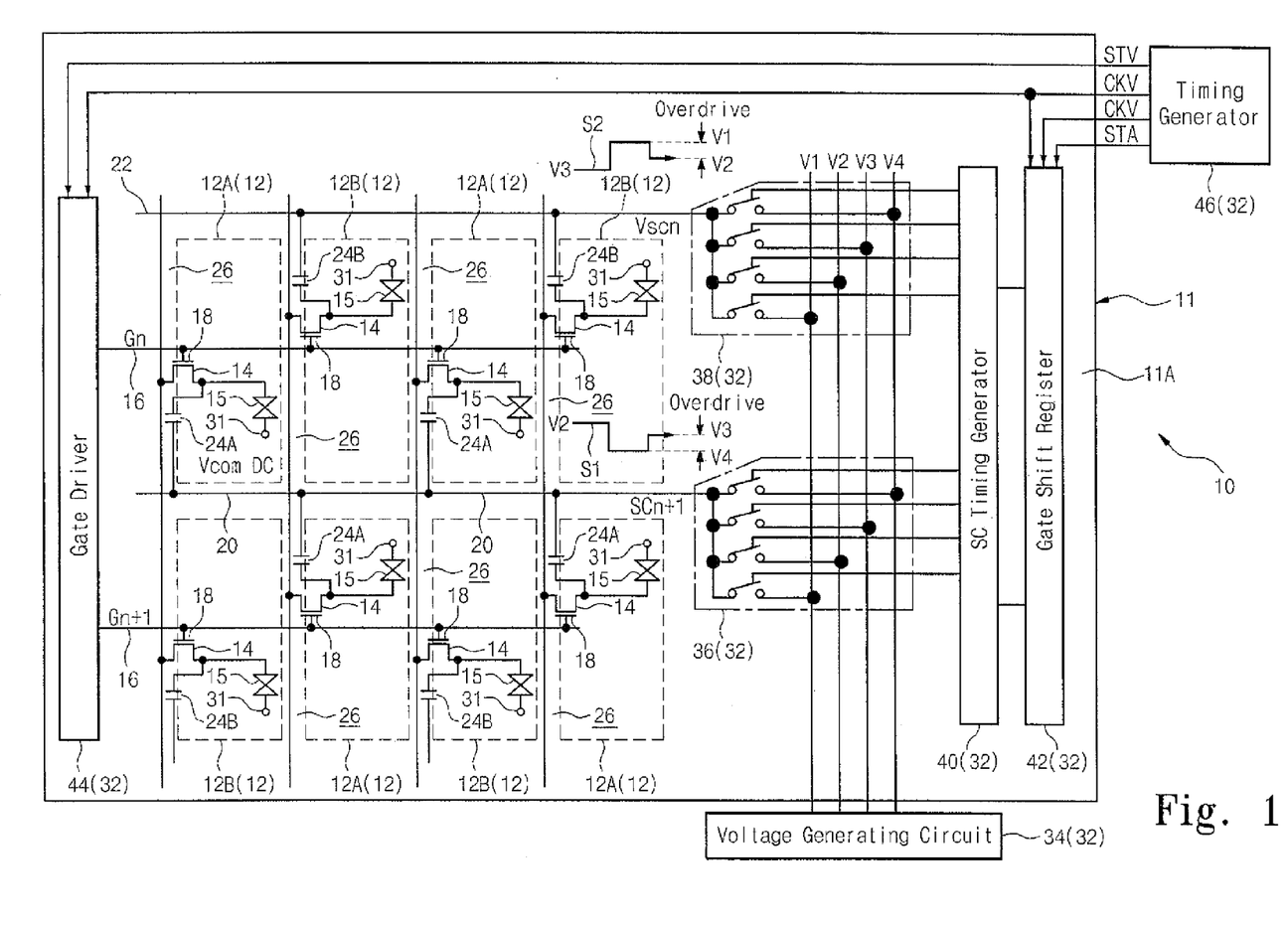
FIG. 1 is a circuit diagram of elements of an LCD according to an exemplary embodiment of the present invention.
Figure 2:
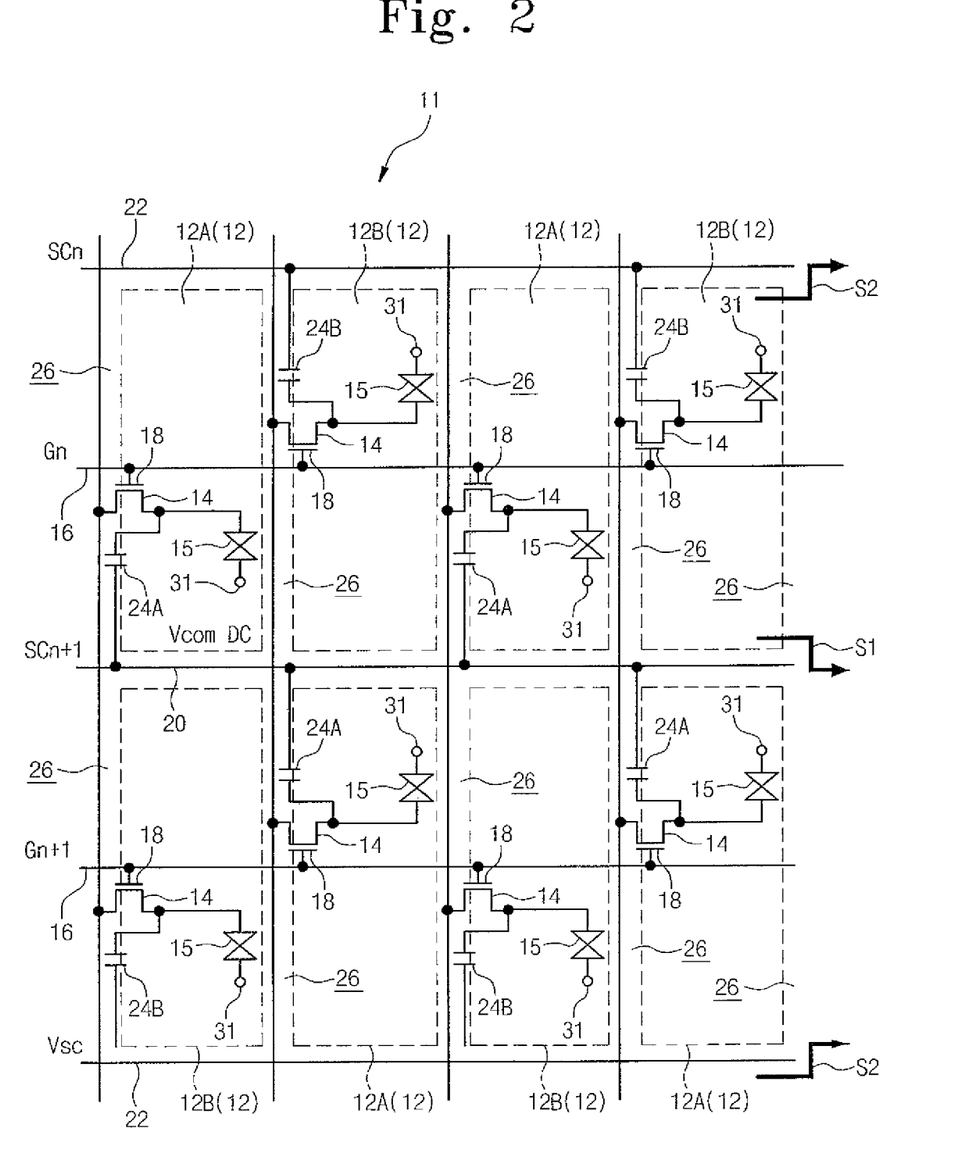
FIG. 2 is a circuit diagram of a display panel of the LCD shown in FIG. 1.

FIG. 1 is a circuit diagram of elements of an LCD according to an exemplary embodiment of the present invention. Referring to FIG. 1, the LCD 10 is an AMLCD and operates by using a dot inversion driving method. However, the LCD 10 may operate by using various other driving methods, such as a line inversion driving method.

The LCD 10 comprises a display panel 11. The display panel 11 comprises a substrate 11A and a plurality of pixels 12 on the substrate 11A. Each pixel 12 has a rectangular shape in which the longitudinal length thereof may be longer than the transversal length thereof. The pixels 12 are aligned in row and column directions, thereby forming a matrix pattern.

Each pixel 12 includes a TFT 14, a liquid crystal capacitor 15. One terminal of each liquid crystal capacitor 15 is connected to an output terminal of each TFT 14. The liquid crystal capacitor 15 is defined by a pixel electrode, a common electrode facing the pixel electrode and a liquid crystal layer interposed between the pixel electrode and the common electrode.

The pixels 12 may be classified into pixels belonging to a first group and pixels belonging to a second group. Hereinafter, the pixels 12 belonging to the first group will be referred to as a first group pixel 12A, and the pixels 12 belonging to the second group will be referred to as a second group pixel 12B. The first group pixel 12A and the second group pixel 12B are alternatively aligned in the row direction and the column direction.

A gate line 16 is aligned at the central portion of each pixel 12. The gate line 16 extends in a row direction and passes through the central axis of each pixel 12. The gates 18 of the TFTs 14 are connected to the gate lines 16. The gate lines 16 supply driving signals to the gates 18 of the TFTs 14 in the pixels 12. Accordingly, the TFTs 14 drive corresponding pixels 12, respectively.

The display panel 11 includes first sub-capacitor lines 20 that are parallel to the gate lines 16 in the row direction of the pixels 12. Each first sub-capacitor line 20 is aligned or formed along one end of the pixels 12 in the row direction of the pixels 12. The first sub-capacitor line 20 extends in a direction parallel to the central axis of the pixel 12. For example, this relationship is applicable even if the first sub-capacitor line 20 extends in a zigzag manner.

The display panel 11 includes second sub-capacitor lines 22 that are parallel to the gate lines 16 in the row direction of the pixels 12. The first and second sub-capacitor lines 20 and 22 are aligned in parallel with one another while the gate lines 16 are interposed therebetween. Each first sub-capacitor line 20 is aligned at one side of a gate line 16 and each second sub-capacitor line 22 is aligned at the other side of the gate line 16.

Since the first and second sub-capacitor lines 20 and 22 do not overlap with portions of the pixels 12 where light is transmitted, the aperture ratio of the pixels 12 can be improved.

First sub-capacitors 24A are included in the first group pixel 12A of the pixels 12. Each first sub-capacitor 24A is connected between output terminal of a TFT 14 of the first group pixel 12A and a first sub-capacitor line 20.

Second sub-capacitors 24B are included in the second group pixel 12B of the pixels 12. Each second sub-capacitor 24B is connected between an output terminal of a TFT 14 of the second group pixel 12B and a second sub-capacitor line 22.

The first sub-capacitors 24A and the second sub-capacitors 24B are alternatively aligned in the row direction and the column direction of the pixels 12, respectively. The first sub-capacitors 24A and the second sub-capacitors 24B have substantially the same capacitance value.

Each first sub-capacitor 24A is formed on a boundary 26 of a second group pixel 12B that is adjacent to a first group pixel 12A. Each second sub-capacitor 24B is formed on a boundary 26 of a first group pixel 12A adjacent to a second group pixel 12B.

Figure 5:
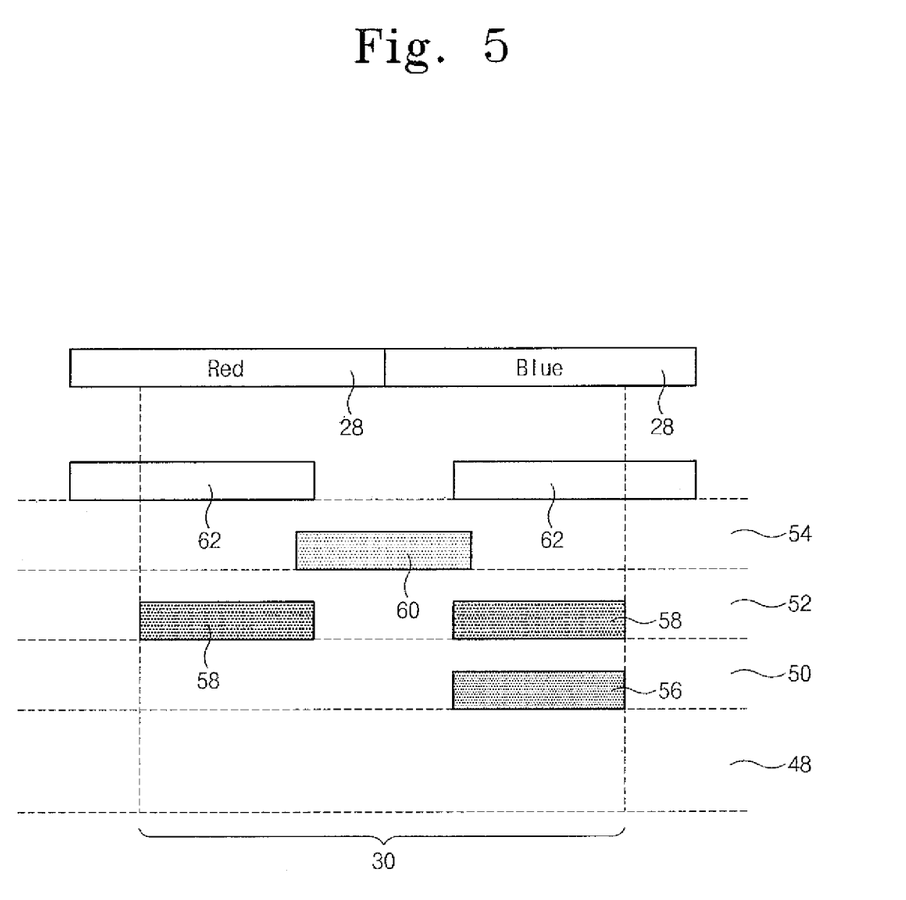
FIG. 5 is a sectional view taken along line 5-5 in FIG. 4.

Color filters 28 as shown in FIG. 5 are disposed on the pixels 12. The color filters 28 correspond to pixels 12, respectively. A plurality of light blocking sections 30 are formed corresponding to the boundaries 26 adjacent to the color filters 28.

Referring to FIG. 5, a gate insulating layer 50 is formed on the lowest layer 48. The lowest layer 48 may comprise glass. A semiconductor layer 56 is formed at the lower portion of the gate insulating layer 50. The semiconductor layer 56 is disposed to the right of the longitudinal center line (the boundary between the red color filter 28 and the blue color filter 28) of FIG. 5.

An interlayer dielectric layer 52 is formed on the gate insulating layer 50. A pair of gate line layers 58 is formed at the lower portion of the interlayer dielectric layer 52. The gate line layers 58 are spaced apart from each other about the longitudinal center line of FIG. 5.

The first sub-capacitor 24A in the first group pixel 12A and the second sub-capacitor 24B in the second group pixel 12B are formed between the gate line layers 58 and the semiconductor layer 56.

A passivation layer 54 is formed on the interlayer dielectric layer 52. A signal line layer 60 is formed at the lower portion of the passivation layer 54 about the longitudinal center line of FIG. 5. The signal line layer 60 is disposed above the gate line layers 58 such that both side ends of the signal line layer 60 correspond to opposite end portions of the gate line layers 58.

A pair of display electrode layers 62 is formed above the passivation layer 54 while being spaced apart from each other about the longitudinal center line of FIG. 5. The opposite ends of the display electrode layers 62 are aligned above the signal line layer 60 in correspondence with both side ends of the signal line layer 60.

The first sub-capacitors 24A and the second sub-capacitors 24B are formed below the light blocking sections 30, respectively. The light blocking sections 30 of FIG. 5 correspond to light blocking sections 30A, 30B, 30C, 30D and 30E in FIG. 4. The first sub-capacitors 24A and the second sub-capacitors 24B overlap with the light blocking sections 30, so that the aperture ratio of the pixels 12 can be significantly improved.

Figure 4:
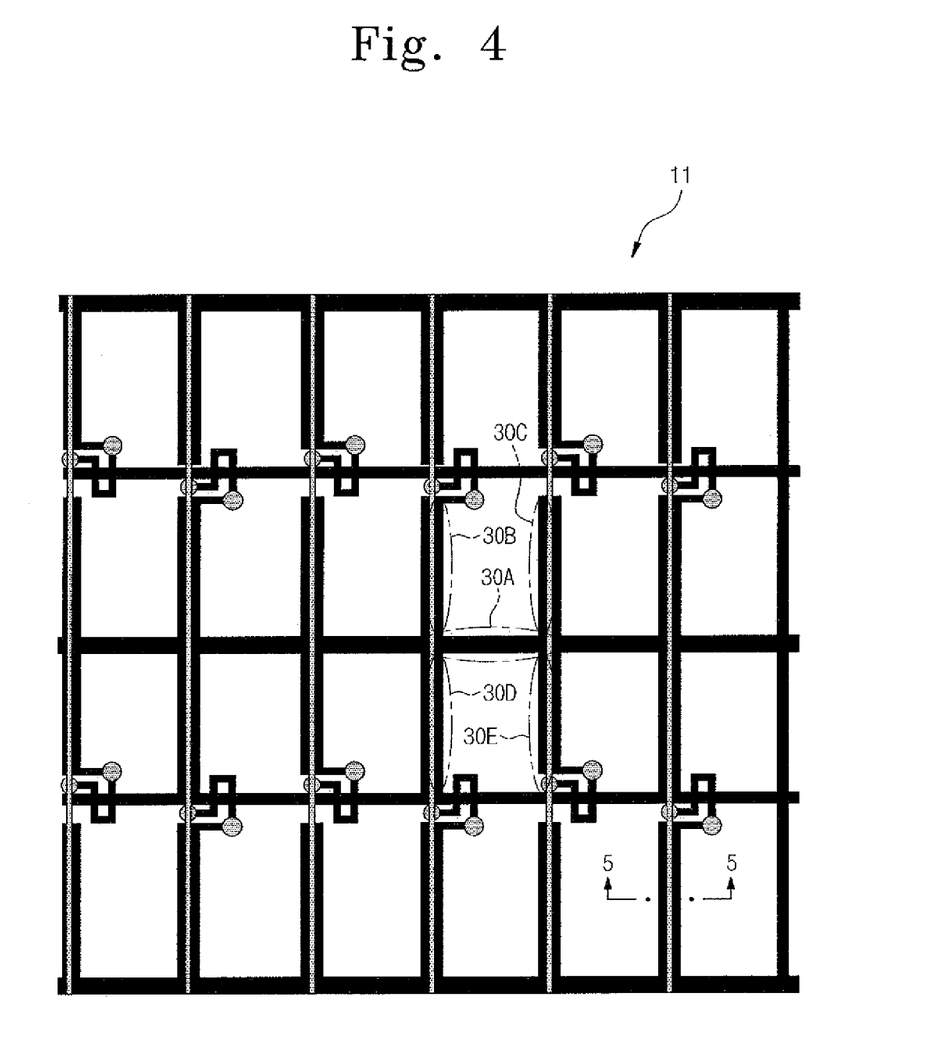
FIG. 4 is a view schematically showing positions at which sub-capacitors are formed in pixels of an LCD according to an exemplary embodiment of the present invention.

The first sub-capacitors 24A and the second sub-capacitors 24B can be formed below the light blocking sections 30A in FIG. 4 that are disposed at boundaries between the first group pixel 12A and the second group pixel 12B in the row direction. The first sub-capacitors 24A and the second sub-capacitors 24B can be formed below the light blocking sections 30B, 30C, 30D and 30E in FIG. 4 that are disposed at boundaries between the first group pixel 12A and the second group pixel 12B in the column direction. The first sub-capacitors 24A and the second sub-capacitors 24B can be integrated with each other in areas including combinations of at least one of the light blocking sections 30B, 30C, 30D and 30E in FIG. 4) that are disposed at boundaries between the first group pixel 12A and the second group pixel 12B in the column direction, as well as the light blocking sections 30A in FIG. 4 disposed at boundaries between the first group pixel 12A and the second group pixel 12B in the row direction.

The display panel 11 further comprises an opposite substrate (not shown) facing the substrate 11A. A common electrode connected to the other terminal of the liquid crystal capacitor 15 is formed on the opposite substrate.

The LCD 10 includes a driving circuit 32. The driving circuit 32 includes a voltage generating circuit 34, a first switch group 36, and a second switch group 38.

Voltages having at least four different values are provided by the driving circuit 32. The embodiment of the present invention illustrated in FIG. 1 uses four different voltage values (V1 to V4). However, the present invention is not limited thereto, as additional voltage values may be used. The voltage generating circuit 34 generates the voltages (V1 to V4) having four different values.

The first switch group 36 selects one of the four voltages V1 to V4 and supplies the selected voltage to the first sub-capacitor line 20. The first switch group 36 selects the first to fourth voltages (V1 to V4) and sequentially supplies the first to fourth voltages to the first sub-capacitor line 20. Accordingly, the driving circuit 32 operates the LCD 10 in a state in which the liquid crystal capacitor 15 of the first group pixel 12A is capacitively coupled to the first sub-capacitors 24A. As a result, a voltage enabling the desired erect state of the liquid crystal is supplied to the first sub-capacitor line 20, so that the alignment of liquid crystal molecules can be rapidly shifted into a desired erect state.

The second switch group 38 selects one of four voltages V1 to V4 and supplies the selected voltage to the second sub-capacitor line 22. The second switch group 38 selects the first to fourth voltages (V1 to V4) and sequentially supplies the first to fourth voltages to the second sub-capacitor line 22. Accordingly, the driving circuit 32 operates the LCD 10 in a state in which the liquid crystal capacitor 15 of the second group pixel 12B is capacitively coupled to the second sub-capacitors 24B. As a result, a voltage enabling the desired erect state of the liquid crystal is supplied to the second sub-capacitor line 22, so that the alignment of liquid crystal molecules can be rapidly shifted into a desired erect state.

An SC timing generator 40 is connected to the first and second switch groups 36 and 38 as a switch control timing generator. The SC timing generator 40 is part of the driving circuit 32 together with the voltage generating circuit 34, the first switch group 36 and the second switch group 38. The SC timing generator 40 controls the switch operation timings of the first switch group 36 and the second switch group 38. The SC timing generator 40 operates in synchronization with the vertical synchronization start signal STV shown in FIG. 7.

A SC shift register 42 is connected to the SC timing generator 40. The SC shift register 42 is part of the driving circuit 32 together with the voltage generating circuit 34, the first switch group 36, the second switch group 38 and the SC timing generator 40. The SC shift register 42 operates based on a video synchronization signal CKV, an STA signal and an STB signal, and outputs a command signal regarding the gate lines 16 selected by the SC timing generator 40 to the SC timing generator 40.

A gate driver 44 is connected to the gate line 16. The gate driver 44 is part of the driving circuit 32 together with the voltage generating circuit 34, the first switch group 36, the second switch group 38, the SC timing generator 40 and the SC shift register 42. The gate driver 44 supplies or outputs a gate driving signal to the gate lines 16 corresponding to pixels 12 in an operation based on the vertical synchronization start signal STV and the video synchronization signal CKV.

The voltage generating circuit 34, the first switch group 36, the second switch group 38, the SC timing generator 40, the SC shift register 42 and the gate driver 44 are connected to a timing generator 46. The timing generator 46 is a part of the driving circuit 32 together with the voltage generating circuit 34, the first switch group 36, the second switch group 38, the SC timing generator 40, the SC shift register 42 and the gate driver 44. The timing generator 46 outputs the vertical synchronization start signal STV, the video synchronization signal CKV, the STA and STB signals, and controls the operations of the voltage generating circuit 34, the first switch group 36, the second switch group 38, the SC timing generator 40, the SC shift register 42 and the gate driver 44.

Figure 6:
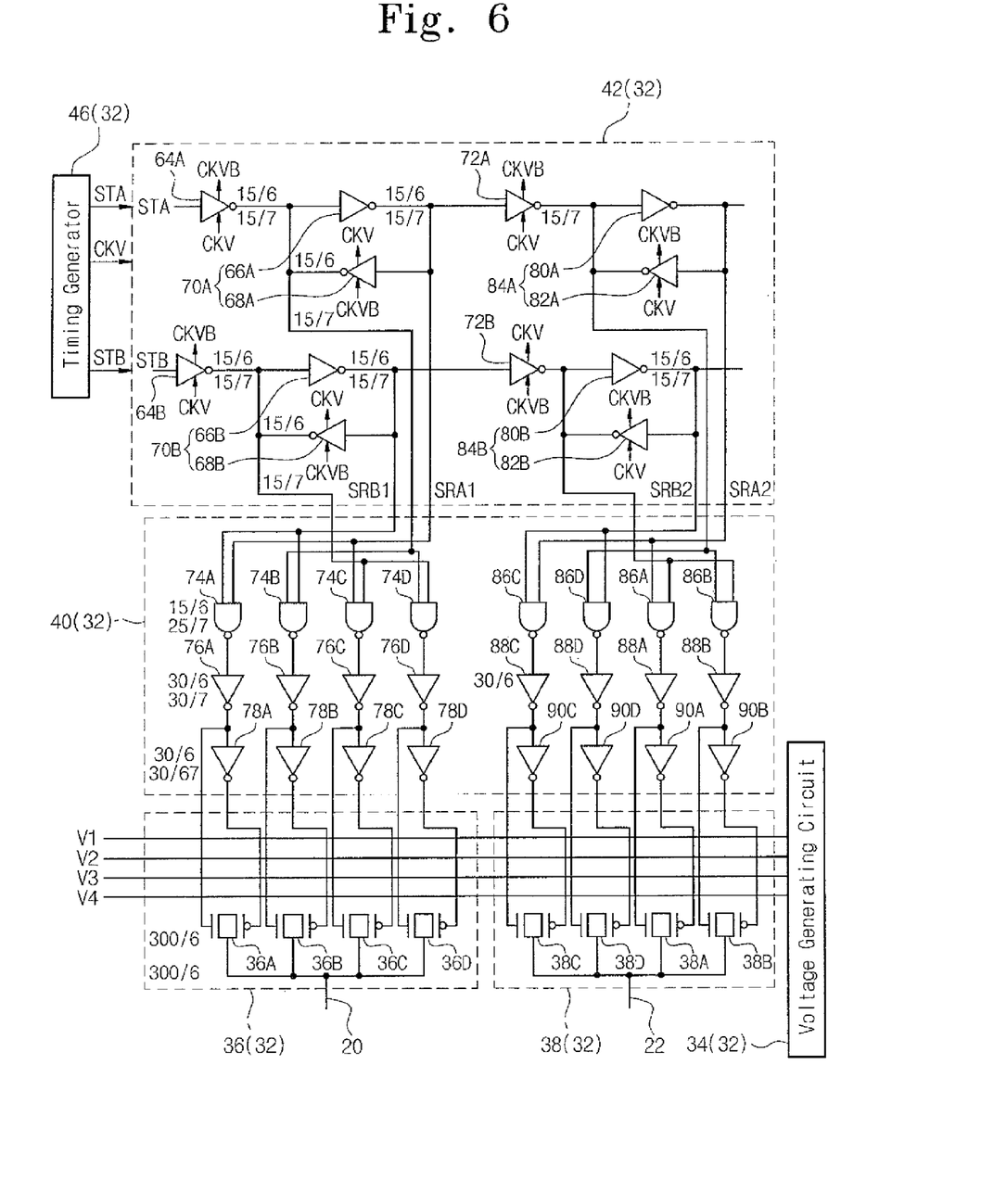
FIG. 6 is a circuit diagram of a driving circuit according to an exemplary embodiment of the present invention.
Figure 7:
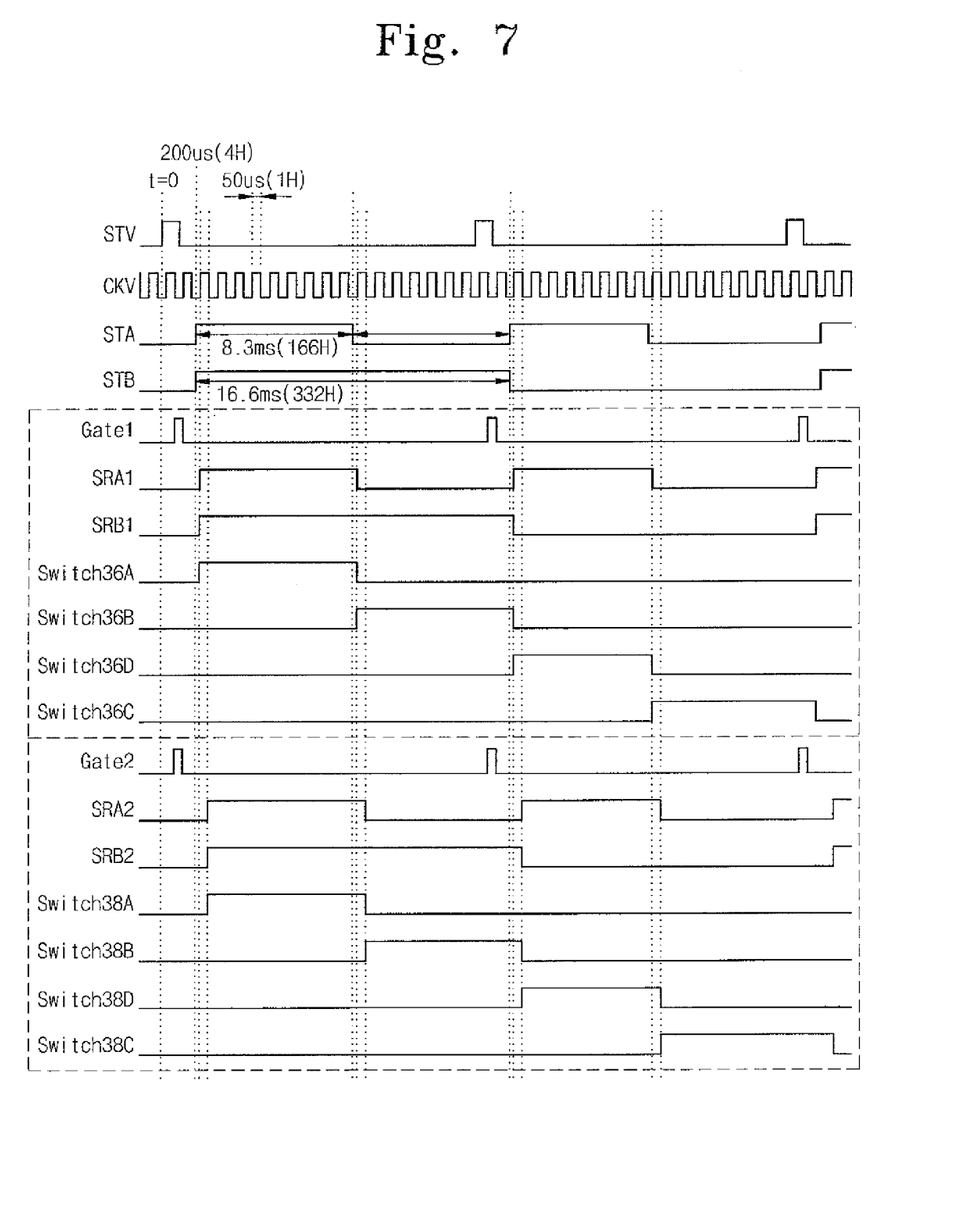
FIG. 7 shows a timing diagram for an operation of a driving circuit according to an exemplary embodiment of the present invention.

Referring to FIGS. 6 and 7, the timing generator 46 outputs the video synchronization signal CKV, and the STA and STB signals to the SC shift register 42. The periods of the STA and STB signals input to the SC shift register 42 are N times as long as the period of the vertical synchronization start signal STV, in which N is a natural number. The periods of SRA signals (SRA1 and SRA2 signals) and SRB signals (SRB1 and SRB2 signals) output from the SC shift register 42 are N times as long as the period of the vertical synchronization start signal STV, in which N is a natural number. In the SC shift register 42, inverters 64A and 72a are connected to the STA line and the inverters 64B and 72B are connected to the STB signal line. The inverters 64A and 64B correspond to the first sub-capacitor line 20 and the inverters 72A and 72B correspond to the second sub-capacitor line 22.

A latch circuit 70A including inverters 66A and 68A is connected after the inverter 64A. A latch circuit 70B including inverters 66B and 68B is connected after the inverter 64B. Signals output from the inverters 64A and 64B are input to the latch circuits 70A and 70B, respectively.

The latch circuits 70A and 70B correspond to the first sub-capacitor line 20. The latch circuits 70A and 70B store a plurality of input signals having different periods for a predetermined time and then output the input signals. At least two latch circuits are connected to each sub-capacitor line 20. The embodiment of the present invention illustrated in FIG. 6 uses two latch circuits 70A and 70B. However, the present invention is not limited thereto, as additional latch circuits may be used. The latch circuit 70A outputs the SRA1 signal as an output signal and simultaneously the latch circuit 70B outputs the SRB1 signal as an output signal.

The output terminal of the inverter 66A of the latch circuit 70A is connected to the input terminal of the inverter 72A and the output terminal of the inverter 66B of the latch circuit 70B is connected to the input terminal of the inverter 72B, which correspond to the second sub-capacitor line 22. The signals output from the inverters 66A and 66B are input to the inverters 72A and 72B, respectively.

The SRA1 signal, which is a signal output from the inverter 66A of the latch circuit 70A, and the SRB1 signal, which is a signal output from the inverter 66B of the latch circuit 70B, are input to the SC timing generator 40. The SC timing generator 40 operates in synchronization with the vertical synchronization start signal SW.

The SC timing generator 40 has signal lines corresponding to the switches 36A to 36D of the first switch group 36. A NAND gate 74A, an inverter 76A and an inverter 78A are connected to the signal line corresponding to the switch 36A, and a NAND gate 74B, an inverter 76B and an inverter 78B are connected to the signal line corresponding to the switch 36B. A NAND gate 74C, an inverter 76C and an inverter 78C are connected to the signal line corresponding to the switch 36C, and a NAND gate 74D, an inverter 76D and an inverter 78D are connected to the signal line corresponding to the switch 36D. The SC timing generator 40 controls the timing of the switches 36A to 36D of the first switch group 36 in response to the SRA1 signal output from the latch circuit 70A and the SRB1 signal output from the latch circuit 70B.

The output terminal of the inverter 66A of the latch circuit 70A is connected to one input terminal of the NAND gate 74A corresponding to the switch 36A and is simultaneously connected to one input terminal of the NAND gate 74C corresponding to the switch 36C. The output terminal of the inverter 68A of the latch circuit 70A is connected to one input terminal of the NAND gate 74B corresponding to the switch 36B and is simultaneously connected to one input terminal of the NAND gate 74D corresponding to the switch 36D.

The output terminal of the inverter 66B of the latch circuit 70B is connected to the other input terminal of the NAND gate 74A corresponding to the switch 36A and is simultaneously connected to the other input terminal of the NAND gate 74B corresponding to the switch 36B. The output terminal of the inverter 68B of the latch circuit 70B is connected to the other input terminal of the NAND gate 74C corresponding to the switch 36C and is simultaneously connected to the other input terminal of the NAND gate 74D corresponding to the switch 36D.

The input terminal of the inverter 76A is connected to the output terminal of the NAND gate 74A, and the input terminal of the inverter 78A is connected to the output terminal of the inverter 76A. One terminal of the switch 36A is connected to the output terminal of the inverter 78A. A signal line branches between the inverter 76A and the inverter 78A and the branched signal line is connected to the other terminal of the switch 36A.

The input terminal of the inverter 76B is connected to the output terminal of the NAND gate 74B, and the input terminal of the inverter 78B is connected to the output terminal of the inverter 76B. One terminal of the switch 36B is connected to the output terminal of the inverter 78B. A signal line branches between the inverter 76B and the inverter 78B and the branched signal line is connected to the other terminal of the switch 36B.

The input terminal of the inverter 76C is connected to the output terminal of the NAND gate 74C, and the input terminal of the inverter 78C is connected to the output terminal of the inverter 76C. One terminal of the switch 36C is connected to the output terminal of the inverter 78C. A signal line branches between the inverter 76C and the inverter 78C and the branched signal line is connected to the other terminal of the switch 36C.

The input terminal of the inverter 76D is connected to the output terminal of the NAND gate 74D, and the input terminal of the inverter 78D is connected to the output terminal of the inverter 76D. One terminal of the switch 36D is connected to the output terminal of the inverter 78D. A signal line branches between the inverter 76D and the inverter 78D and the branched signal line is connected to the other terminal of the switch 36D. The output terminals of the switches 36A to 36D are connected in parallel to the first sub-capacitor line 20.

A latch circuit 84A including inverters 80A and 82A is connected after the inverter 72A, and a latch circuit 84B comprising inverters 80B and 82B is installed after the inverter 72B in such a manner that the latch circuits 84A and 84B correspond to the second sub-capacitor line 22. Signals output from the inverters 72A and 72B are input to the latch circuits 84A and 84B, respectively.

The latch circuits 84A and 84B are connected corresponding to the second sub-capacitor line 22. The latch circuits 84A and 84B stores a plurality of input signals having different periods for a predetermined time and then output the input signals. At least two latch circuits are connected at each sub-capacitor line 22. The embodiment of the present invention illustrated in FIG. 6 uses two latch circuits 84A and 84B. However, the present invention is not limited thereto, as additional latch circuits may be used. The latch circuit 84A outputs the SRA2 signal as an output signal and simultaneously the latch circuit 84B outputs the SRB2 signal as an output signal.

The output terminal of the inverter 80A of the latch circuit 84A is connected to an input terminal of an inverter 64A and the output terminal of the inverter 80B of the latch circuit 84B is connected to the input terminal of the inverter 64A, which correspond to a first sub-capacitor line 20 of a subsequent stage. The signals output from the inverters 80A and 80B are input to the inverters 64A and 64B of the subsequent stage, respectively.

The SRA2 signal, which is a signal output from the inverter 80A of the latch circuit 84A, and the SRB2 signal, which is a signal output from the inverter 80B of the latch circuit 84B, are input to the SC timing generator 40. The SC timing generator 40 operates in synchronization with the vertical synchronization start signal STV.

The SC timing generator 40 has signal lines corresponding to the switches 38A to 38D of the second switch group 38. A NAND gate 86C, an inverter 88C and an inverter 90C are connected to the signal line corresponding to the switch 38C, and a NAND gate 86D, an inverter 88D and an inverter 90D are connected to the signal line corresponding to the switch 38D. A NAND gate 86A, an inverter 88A and an inverter 90A are connected to the signal line corresponding to the switch 38A, and a NAND gate 86B, an inverter 88B and an inverter 90B are connected to the signal line corresponding to the switch 38B. The SC timing generator 40 controls timing of the switches 38A to 38D of the second switch group 38 in response to the SRA2 signal output from the latch circuit 84A and the SRB2 signal output from the latch circuit 84B.

The output terminal of the inverter 80A of the latch circuit 84A is connected to one input terminal of the NAND gate 86C corresponding to the switch 38C and is simultaneously connected to one input terminal of the NAND gate 86A corresponding to the switch 38k The output terminal of the inverter 82A of the latch circuit 84A is connected to one input terminal of the NAND gate 86D corresponding to the switch 38D and is simultaneously connected to one input terminal of the NAND gate 86B corresponding to the switch 38B.

The output terminal of the inverter 80B of the latch circuit 84B is connected to the other input terminal of the NAND gate 86C corresponding to the switch 38C and is simultaneously connected to the other input terminal of the NAND gate 86D corresponding to the switch 38D. The output terminal of the inverter 82B of the latch circuit 84B is connected to the other input terminal of the NAND gate 86A corresponding to the switch 38A and is simultaneously connected to the other input terminal of the NAND gate 86B corresponding to the switch 38B.

The input terminal of the inverter 88A is connected to the output terminal of the NAND gate 86A, and the input terminal of the inverter 90A is connected to the output terminal of the inverter 88A. One terminal of the switch 38A is connected to the output terminal of the inverter 90A. A signal line branches between the inverter 88A and the inverter 90A and the branched signal line is connected to the other terminal of the switch 38A.

The input terminal of the inverter 88B is connected to the output terminal of the NAND gate 86B, and the input terminal of the inverter 90B is connected to the output terminal of the inverter 88B. One terminal of the switch 38B is connected to the output terminal of the inverter 90B. A signal line branches between the inverter 88B and the inverter 90B and the branched signal line is connected to the other terminal of the switch 38B.

The input terminal of the inverter 88C is connected to the output terminal of the NAND gate 86C, and the input terminal of the inverter 90C is connected to the output terminal of the inverter 88C. One terminal of the switch 38C is connected to the output terminal of the inverter 90C. A signal line branches between the inverter 88C and the inverter 90C and the branched signal line is connected to the other terminal of the switch 38C.

The input terminal of the inverter 88D is connected to the output terminal of the NAND gate 86D, and the input terminal of the inverter 90D is connected to the output terminal of the inverter 88D. One terminal of the switch 38D is connected to the output terminal of the inverter 90D. A signal line branches between the inverter 88D and the inverter 90D and the branched signal line is connected to the other terminal of the switch 38D.

The output terminals of the switches 38A to 38D are connected in parallel to the second sub-capacitor lines 22.

The latch circuit 70A corresponding to the first sub-capacitor line 20 is serially connected to the latch circuit 84A corresponding to the second sub-capacitor line 22, so that data can be transmitted between the latch circuits 70A and 84A in a single direction. The latch circuit 70B corresponding to the first sub-capacitor line 20 is serially connected to the latch circuit 84B corresponding to the second sub-capacitor line 22, so that data can be transmitted between the latch circuits 70B and 84B in a single direction.

FIG. 7 shows the operation timing of the driving circuit 32 according to an exemplary embodiment of the present invention. When the vertical synchronization start signal STV is input to the gate driver 44 from the timing generator 46, the gate driving signal is supplied to all gate lines 16 in synchronization with the video synchronization signal CKV. The gate 18 of each TFT 14 connected to each gate line 16 is turned on and simultaneously the video synchronization signal CKV, and the STA and STB signals are input to the SC shift register 42.

When the video synchronization signal CKV, and the STA and STB signals are input to the SC shift register 42, the SRA1 and SRB1 signals are output to the SC timing generator 40 from the latch circuits 70A and 70B, respectively, in response to the video synchronization signal CKV, and the STA and STB signals.

The SRA2 and SRB2 signals are output to the SC timing generator 40 from the latch circuits 84A and 84B, respectively, in response to the SRA1 and SRB1 signals output from the latch circuits 70A and 70B.

When the SRA1 and SRB1 signals are input to the SC timing generator 40, one of the switches 36A to 36D is selected in response to the SRA1 and SRB1 signals, so the driving signal is supplied to the first sub-capacitor line 20. When the SRA2 and SRB2 signals are input to the SC timing generator 40, the SC timing generator 40 selects one of the switches 38A to 38D in response to the SRA2 and SRB2 signals, and supplies the driving signal to the second sub-capacitor line 22. The SC timing generator 40 changes the states of the switches 36A to 36D of the first switch group 36 and the switches 38A to 38D of the second switch group 38 based on the signal output from the SC shift register 42. The SC timing generator 40 continuously outputs switch selection signals (switch selection information), which are provided to the switches 36A to 36D of the first switch group 36 and the switches 38A to 38D of the second switch group 38, until the signal output from the SC shift register 42 changes. The SC shift register 42 stores a plurality of input signals having different periods for a predetermined time and then outputs the input signals.

The driving circuit 32 supplies the gate driving signal having a predetermined period to the gate lines 16 and simultaneously supplies a first signal S1 synchronized with the gate driving signal to the first sub-capacitor line 20. The driving circuit 32 supplies a second signal S2 having a phase substantially inverse to that of the first signal S1 to the second sub-capacitor line 22. The second signal S2 has a timing slower than that of the first signal S1 by one horizontal period. However, the difference between the supply timings of the second signal S2 and the first signal S1 is not limited to one horizontal period, as the difference may be less than or greater than one horizontal period. The driving circuit 32 supplies the first to fourth voltages to the first sub-capacitor line 20 and the second sub-capacitor line 22, in which the first voltage V1>the second voltage V2>the third voltage V3>the fourth voltage V4.

Figure 3A:
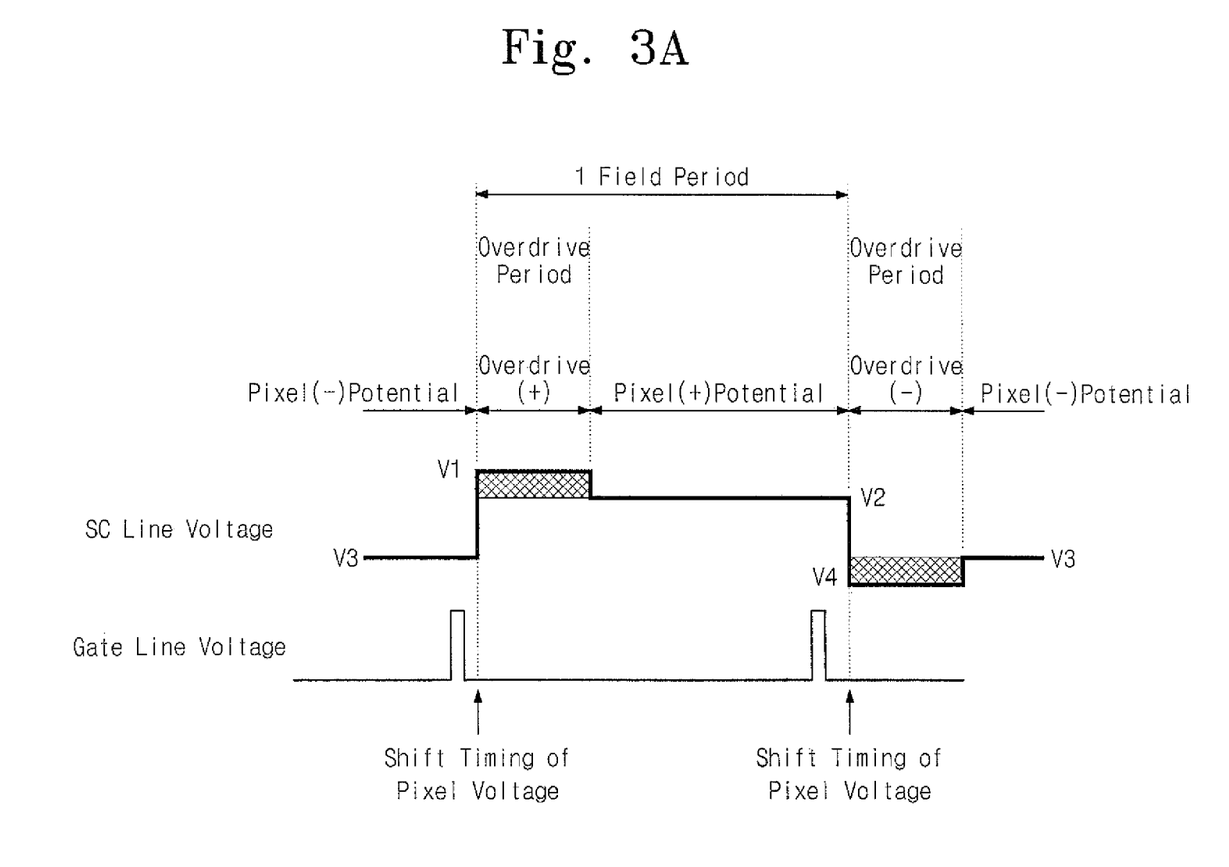
FIG. 3A is a signal waveform showing a driving method of an LCD according to an exemplary embodiment of the present invention.

As shown in FIG. 3A, the driving circuit 32 repeatedly supplies the first to fourth voltages to the first sub-capacitor line 20 and the second sub-capacitor line 22 in the sequence of the third voltage V3, the first voltage V1, the second voltage V2 and the fourth voltage V4.

The driving circuit 32 overdrives the voltage supplied to the first sub-capacitor line 20 and the second sub-capacitor line 22 directly after turning on the gates 18 of the TFTs 14, which is at the shift timing of the voltage (pixel voltage) of the pixels 12.

When the electric potential of the first group pixel 12A transitions from (−) to (+) and simultaneously the electric potential of the second group pixel 12B transitions from (+) to (−), and when the third voltage V3 is being supplied to the first sub-capacitor line 20 and simultaneously the second voltage V2 is being supplied to the second sub-capacitor line 22, the driving circuit 32 applies the driving voltage (the gate driving signal) to the gate lines 16, and turns on the gate 18 of the TFT 14 in a corresponding pixel 12, which turns on the TFT 14. Then, the overdrive period is entered.

After applying the third voltage V3, the driving circuit 32 applies the first voltage V1 higher than the second voltage V2 to the first sub-capacitor line 20. The higher voltage (V1-V3) can be applied to the first sub-capacitor line 20 as compared to when the second voltage V2 is applied to the first sub-capacitor line 20 from the third voltage V3. In the latter example, the voltage (V2-V3) is applied to the first sub-capacitor line 20.

The driving circuit 32 applies the fourth voltage V4 lower than the third voltage V3 to the second sub-capacitor line 22. The higher voltage (V4-V2) can be applied to the second sub-capacitor line 22 as compared to when the third voltage V3 is applied to the second sub-capacitor line 22 from the second voltage V2. In the latter example, the voltage (V3-V2) is applied to the second sub-capacitor line 22.

When the electric potential of the first group pixel 12A transitions from (+) to (−) and simultaneously the electric potential of the second group pixel 12B is changed from (−) to (+), and when the second voltage V2 is being supplied to the first sub-capacitor line 20 and simultaneously the third voltage V3 is being supplied to the second sub-capacitor line 22, the driving circuit 32 applies the driving voltage (the gate driving signal) to the gate line 16, and turns on the gate 18 of the TFT 14 in a corresponding pixel 12, which turns on the TFT 14. Then, the overdrive period is entered.

After applying the second voltage V2, the driving circuit 32 applies the fourth voltage V4 lower than the third voltage V3 to the first sub-capacitor line 20. Accordingly, the higher voltage (V4-V2) can be applied to the first sub-capacitor line 20 as compared to when the third voltage V3 is applied to the first sub-capacitor line 20 from the second voltage V2. In the latter example, the voltage (V3-V2) is applied to the first sub-capacitor line 20.

After applying the third voltage V3, the driving circuit 32 applies the first voltage V1 higher than the second voltage V2 to the second sub-capacitor line 22. Accordingly, the higher voltage (V1-V3) can be applied to the second sub-capacitor line 22 as compared to when the second voltage V2 is applied to the second sub-capacitor line 22 from the third voltage V3. In the latter example, the voltage (V2-V3) is applied to the second sub-capacitor line 22.

According to at least one embodiment of the present invention, the higher voltage is supplied to the sub-capacitors 24A and 24B when applying voltage to the liquid crystal capacitor 15, so that the alignment of the liquid crystal molecules can be rapidly shifted into a desired erect state. In addition, the voltage (pixel voltage) of the pixels 12 can be maintained in a proper range for a long time.

Figure 3B:
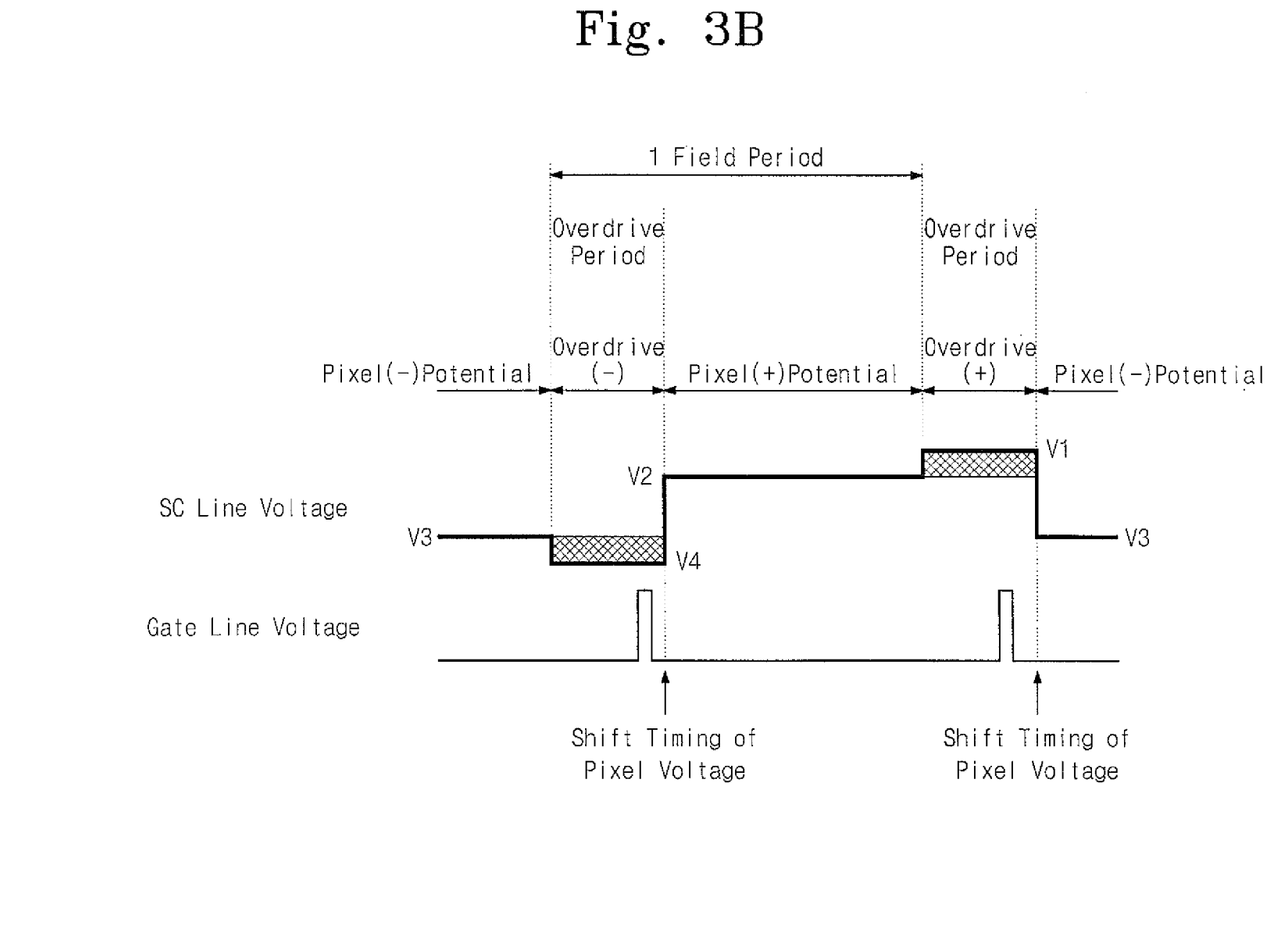
FIG. 3B is a signal waveform showing a driving method of an LCD according to an exemplary embodiment of the present invention

A driving circuit 32 according to at least one embodiment of the present invention repeatedly supplies the first to fourth voltages to the first sub-capacitor line 20 and the second sub-capacitor line 22 in the sequence of the third voltage V3, the first voltage V1, the second voltage V2 and the fourth voltage V4. However, as shown in FIG. 3B, the driving circuit 32 can repeatedly supply the first to fourth voltages to the first sub-capacitor line 20 and the second sub-capacitor line 22 in the sequence of the third voltage V3, the fourth voltage V4, the second voltage V2 and the first voltage V1. When the driving circuit 32 repeatedly supplies the first to fourth voltages to the first sub-capacitor line 20 and the second sub-capacitor line 22 in the sequence of the third voltage V3, the fourth voltage V4, the second voltage V2 and the first voltage V1, when the fourth voltage V4 or the first voltage V1 is being supplied, the driving circuit 32 applies the gate driving signal (driving voltage) to the gate lines 16, thereby turning on the TFTs 14.

According to at least one embodiment of the present invention, a plurality of pixels are aligned in a predetermined direction and each pixel has a TFT. A driving signal is supplied to the gate of each TFT in each pixel through the gate lines. Sub-capacitor lines are aligned in parallel to the gate lines. One of at least four voltage values is selected by the driving circuit and the voltage having the selected voltage value is supplied to the sub-capacitor lines. The voltage having a voltage value selected by the driving circuit is supplied to the sub-capacitor lines, so that the liquid crystal is capacitively coupled to a sub-capacitor for operation. The voltage having a voltage value that enables a desired erect state of the liquid crystal is supplied to the sub-capacitor lines, so that the alignment of the liquid crystal molecules can be rapidly shifted into a desired erect state.

While the present invention has been particularly shown and described with reference to exemplary embodiments thereof, it is to be understood that the present invention is not limited to these exemplary embodiments, but various changes and modifications can be made by one ordinary skilled in the art within the spirit and scope of the present invention.

What is claimed is:

1. A liquid crystal display comprising:
a plurality of pixels, wherein each pixel comprises a thin film transistor (TFT) and is classified as one of a first group pixel and a second group pixel;
a gate line supplying a driving signal to a gate of each TFT of each pixel;
a liquid crystal capacitor arranged in each pixel and connected to one terminal of the TFT in a corresponding pixel;
a sub-capacitor line comprising a first sub-capacitor line and a second sub-capacitor line aligned such that the gate line is interposed between the first and second sub-capacitor lines;
a first sub-capacitor arranged in the first group pixel and connected between one terminal of the TFT in a corresponding pixel and the first sub-capacitor line; and
a second sub-capacitor arranged in the second group pixel and connected between one terminal of the TFT in a corresponding pixel and the second sub-capacitor line,
wherein the first group pixel and second group pixel are connected to different source lines, and
wherein the first sub-capacitor line and the second sub-capacitor line do not overlap with portions of the pixels.

2. The liquid crystal display of claim 1, wherein the first sub-capacitor line and the second sub-capacitor line are disposed between the first group pixel and the second group pixel adjacent to the first group pixel in the source lines extending direction.

3. The liquid crystal display of claim 1, further comprising a plurality of light blocking sections corresponding to boundaries adjacent to the pixels, wherein the first sub-capacitor line and the second sub-capacitor line are totally covered with the light blocking sections in a plan view.

4. The liquid crystal display of claim 1, further comprising:
a plurality of color filters disposed on the pixels; and
a plurality of light blocking sections formed corresponding to boundaries adjacent to the color filters.

5. The liquid crystal display of claim 4, wherein the first sub-capacitor and the second sub-capacitor are formed below the light blocking sections, respectively.

6. The liquid crystal display of claim 4, wherein the first sub-capacitor and the second sub-capacitor overlap with the light blocking sections, respectively.

7. The liquid crystal display of claim 4, wherein the first sub-capacitor and the second sub-capacitor are formed between a gate line layer and a semiconductor layer.

* * * * *